United States Patent
Azami

[15] 3,652,260
[45] Mar. 28, 1972

[54] METHOD OF PREPARING METAL CONTAINING PELLETS FROM BLAST FURNACE DUST AND CONVERTER DUST

[72] Inventor: Masutaro Azami, 3-27 Zaimakuza, 5-chome, Kamakura, Japan

[22] Filed: Feb. 13, 1970

[21] Appl. No.: 11,116

[30] Foreign Application Priority Data

Feb. 19, 1969 Japan....................................44/11771

[52] U.S. Cl....................................................................75/3
[51] Int. Cl. .........................................................C21b 1/10
[58] Field of Search ...............................................75/3, 5, 25

[56] References Cited

UNITED STATES PATENTS

| | | | |
|---|---|---|---|
| 3,146,088 | 8/1964 | Tsujihata et al. | 75/3 |
| 2,780,536 | 2/1957 | Carney | 75/25 X |
| 3,386,816 | 6/1968 | English | 75/3 X |

*Primary Examiner*—Allen B. Curtis
*Attorney*—McGlew and Toren

[57] ABSTRACT

Blast furnace dust and converter dust are mixed with each other and then formed into green pellets containing 7 to 20 percent by weight of carbon. These pellets, after being dried at a temperature below 250° C., are charged into a rotary reducing furnace, in which the pellets are reduced by means of the carbon component contained therein.

10 Claims, 5 Drawing Figures

PATENTED MAR 28 1972

→: DIRECTION OF REACTION

INVENTOR:
MASUTARO AZAMI
By: McGlew & Toren
ATTORNEYS

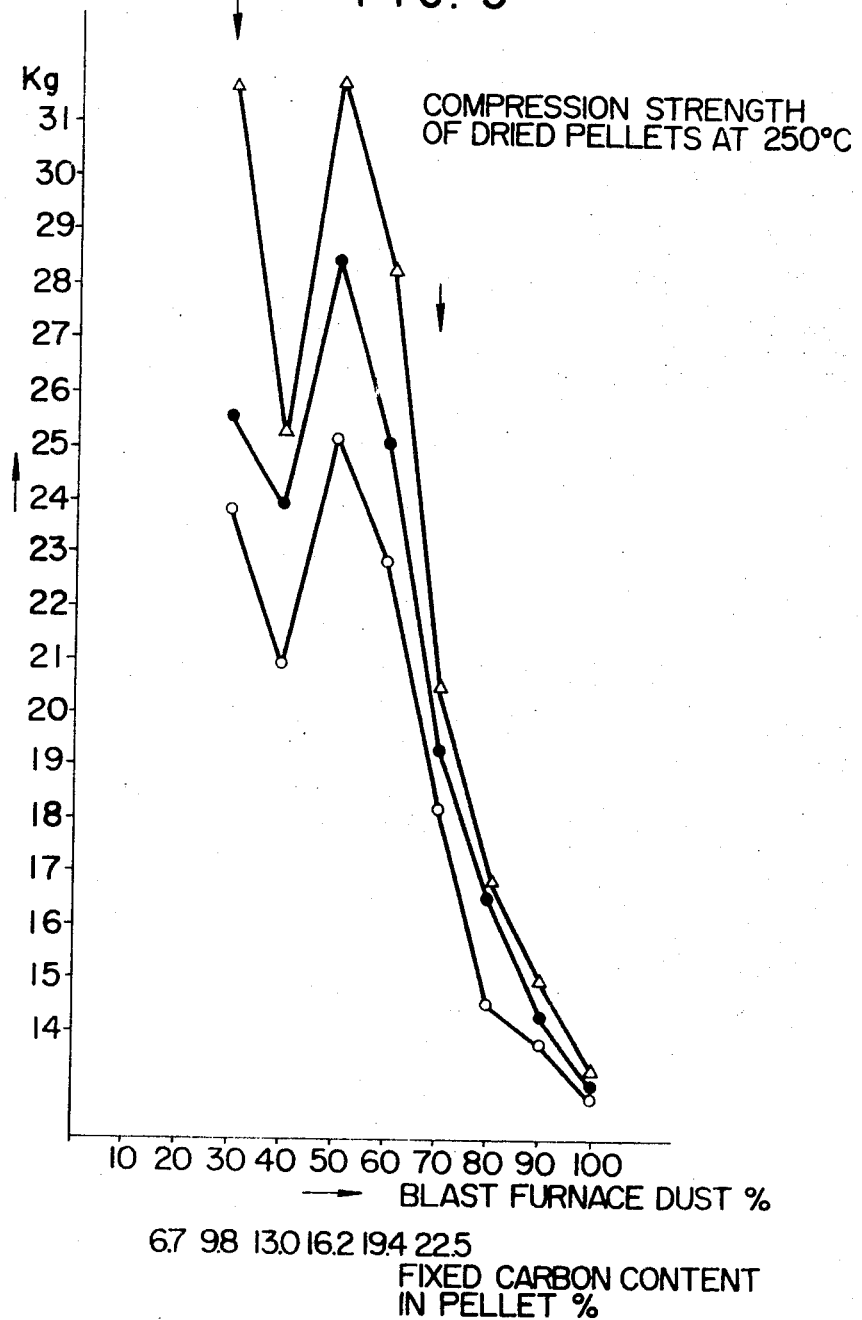

METHOD OF PREPARING METAL CONTAINING PELLETS FROM BLAST FURNACE DUST AND CONVERTER DUST

BACKGROUND OF THE INVENTION

This invention relates to a method of preparing metal containing pellets from blast furnace dust and converter dust.

In one of known methods of utilizing blast furnace dust now in use, carbon and iron oxides are separated by flotation, and the oxide of iron is used as material for pellets while carbon is used for other purpose. But such separation requires many complicated processes of treatment. There is also another a method in which the blast furnace dust is mixed with other fine ore and fed into a sintering machine so that its carbon utilized for sintering without taking the trouble to separate the carbon therein. However, because the particles of carbon are extremely fine as set forth above, the fine dust, which has flown out of the furnace, must be recovered again. In this way, as is well known, the above-mentioned methods heretofore used are accompanied with much difficulty.

SUMMARY OF THE INVENTION

The inventor gave attention to the advantage of mixing blast furnace dust with converter dust without separating fine carbon material contained in the blast furnace dust to form into green pellets.

In accordance with the invention, blast furnace dust and converter dust are mixed with each other and then formed into green pellets of high strength containing 7 to 20 percent by weight of carbon. These pellets are dried at a temperature below 250° C. and then charged into a rotary reducing furnace in which the pellets are reduced by means of carbon component contained therein.

Thus, the carbon material, which otherwise has been difficult to be separated and of less utility, can now be used as a reducing agent for the oxide of iron in the pellets. The very fine blast furnace dust and converter dust enable to make the pellets of very high strength without introducing any grinding process of the raw material of the pellets.

BRIEF DESCRIPTION OF THE DRAWINGS

In the drawings:

FIGS. 4 and 5 are diagrams showing the compression strength of pellets.

DESCRIPTION OF THE PREFERRED EMBODIMENT

Figure 1:
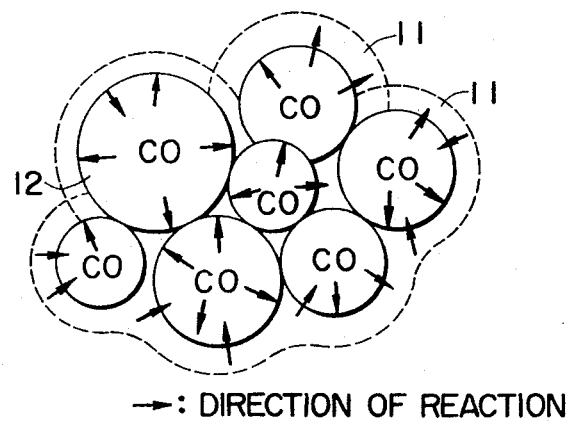
FIG. 1 is a schematic view for explaining the reducing process in the present invention.

Generally, one of the basic requirements for pellet preparation is the strength of green pellets, and it is said that for this purpose the primary factor is that the particle size of iron oxide which is a component of the pellet must be pass through 325 mesh not less than 70 percent. Accordingly, artificial grinding of the pellet materials must be regulated so that this particle size will be kept. Namely, the pellets prepared from the material of more coarse particles because of its low compression strength are easily broken during sintering, and much expense is required for grinding finely the pelletizing materials.

The foregoing condition has been concerned with the ordinary pelletizing of iron oxide, but in order to secure the strength of green pellets which contain carbon therein as in this invention, it is usual that more difficulty will be accompanied with. This is caused by difference in the specific gravity between carbon material and iron oxide, and as the carbon content increases, the compression strength of green pellets becomes lower and the pellets cannot stand up in the subsequent processes.

According to Erik Q. Dahl in the Canadian Mining & Metallurgical Bulletin, Vol. No. 69, page 114–118 (1966), the upper limit of the carbon content of pellets which can be used in reduction as one of subsequent processes in a reducing furnace, for example, in rotary kiln, is, no matter how fine carbon materials are used, 15 percent of the total carbon (Fixed Carbon, referred simply to as F.C. hereinafter) which will be necessary for full reduction of iron oxide (containing the average Fe 60 percent). It also says that, if the carbon content exceed the said limit, the pellets will be broken in the kiln, and it concludes that it is because the green pellets will become coarse and more porous.

However, as for the particles of blast furnace dust and converter dust according to this invention, as will be described in the example, those under 325 mesh are more than 60 percent with respect to the overall particles for the blast furnace dust, and in case of the particles of converter dust, are more than 80 percent with respect to those under 325 mesh are found to be super-fine particles of micron order as the result of microscopic inspection. Those sizes exceed for the said limit of particles of pelletizing materials in which artificial grinding is economically possible.

The inventor has found that, if the mixture of such pelletizing materials as are extremely difficult to be obtained by artificial grinding are used green pellets of extremely high compression strength can be manufactured, although their carbon content is increased.

As will be seen from the example, the green pellets prepared from the mixture of blast furnace dust and converter dust, which contain more than 100 percent of carbon in the theoretical value (F.C. quantity corresponding to that enough to complete the linear reaction $$Fe_2O_3 a z 3C \rightarrow 3CO + 2Fe$$

reducing all of the iron oxide in the pellets), shows the compression strength of average 8.7 kg., maximum 10 kg. and, this strength increases to average 24.5 kg., maximum 30 kg. by drying at 250° C.

The mixing ratio of the blast furnace dust to the converter dust and the physical properties are shown in the following table:

THE RATIO OF BLAST FURNACE ASH TO CONVERTER DUST AND THE PROPERTIES

| Ratio | 30 | 40 | 50 | 60 | 70 |
|---|---|---|---|---|---|
| F.C. quantity(%) | 7–11 | 11–14 | 14–17 | 17–19 | 19–22 |
| Strength of green pellets (kg.) | 14.8 | 12.2 | 10.6 | 8.7 | 7.2 |
| Pellet strength after dryed at 250° C. (kg.) | 38.0 | 32.0 | 28.0 | 24.5 | 18.8 |

On the contrary, the green pellets which were prepared by mixing the artificially ground oxide of iron and the artificially crushed carbon material in 74 percent of the theoretical value, though added with 5 percent portland cement for the purpose of increasing the strength, merely a compression strength of 3.5 kg., and has only average 17.0 kg. even after 3 days aging for the purpose of increasing of the strength thereof.

| Strength of green pellets | Strength of green pellets after 3 days aging |
|---|---|
| 3.2 | 17.4 |
| 3.6 | 19.0 |
| 3.3 | 17.0 |
| 3.6 | 20.4 |
| 3.4 | 16.0 |

Moreover, the carbon content of 175 kg. (F.C.)/950 kg. Fe in the green pellets does not reach 100 percent F.C. quantity as in this invention.

In view of the foregoing, the pellets prepared according to this invention prove to be excellent beyond the conventional technical common sense in respect of the strength and to keep a phisically and mechanically high strength in the subsequent reducing treatment.

The second feature of the pellets of this invention is that they are never subjected to abrasion in the reducing period and keep the strength from the beginning to the end of the reduction.

It is said that the strength of carbon containing pellets, as compared with original green pellets without carbon, decrease their strength at a high temperature reducing zone. The reasons for this seem to be that with a sudden increase of temperature, the water content of the green pellets is vapourized at a temperature up to 250° C., and volatile components of the added carbon expanded explosively at a temperature between 450° and 600° C. by sudden heating which results in breaking the combined structure of the pellets.

On the other hand, the pellets obtained in accordance with this invention are free from water by the careful drying up to 250° C., and since the contained carbon material is in a state of having passed through heating process at a high temperature in the blast furnace, voltaile components are scarcely contained as compared with the case of other carbon sources. Accordingly, purging the green pellets is carried out without any breaking and abrasion due to purging of gaseous components, and the pellets can be transferred to a high temperature zone after the purging is carried out.

As a further characteristic advantage, it is to be mentioned specially that the reducibility of the pellets is excellent when they, while keeping the above sound state, go into the reducing zone at a higher temperature. The reasons for this are as follows:

First, the pellets which contain carbon, as compared with those pellets which do not contain carbon, are better in thermal conductivity. In other words, the heat absorbed reaches quickly to the core part. This is the most advantageous point in the reducing thermal efficiency.

The second reason is that as the carbon particles are in intimate contact with the particles of iron oxide, this is a great advantage in the chemical reaction. The intimate contact between both elements to be reacted with each other, when applied with reducing heat is supplied to, will easily induce a quick reaction. If the efficiency in the linear reducing reaction of $$Fe_2O_3 \text{az} 3C \rightarrow 2Fe + 3CO$$

is considered, as will be shown in the tables of the example hereinafter, an extremely high reducing rate can be attained, as compared with the F.C. efficiency 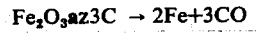

$$\left( \frac{\text{The theoretical quantity of carbon concerned in the reduction}}{\text{The quantity of carbon consumed}} \times 100 \right)$$

by another reducing method using a rotary reducing furnace. This is the reason that the contained carbon is concentrated on deoxidation of the oxide of iron and the CO generated in the pellet has very few chances of reacting with the oxygen in the atmosphere as in another method so that it is effectively utilized. In other words, it can be said that almost all the $CO_2$ generated is produced as the result of combination with oxygen in the oxide of iron.

The heat of reaction in a rotary kiln is usually supplemented with the combustion heat of heavy oil and the heat due to the CO generated in the reaction of combustion into $CO_2$. Further, the promotion of the reducing reaction requires the maintenance of an atmosphere in which CO generated owing to the reaction $CO_2 + C \rightarrow 2CO$ surrounds the pellet so as to be capable of reducing it easily.

In this invention, as is shown in FIG. 1, the CO gas generated in the pellets 12 forms a film-like atmosphere 11 of $CO + CO_2$ on the surface of each of the pellets after completion of the reaction within the pellets. Since these atmosphere layers continue to stick on the pellets and move with the pellets during reduction thereof, there is no chance of reoxidation of the effective CO in the pellet even if the pellets should be subjected to oxidized atmosphere. Only the CO after completion of the reaction may supply the heat of reaction. Thus the reducing efficiency is better than in the reaction by supplying a reducing agent from the outside.

Figure 2:
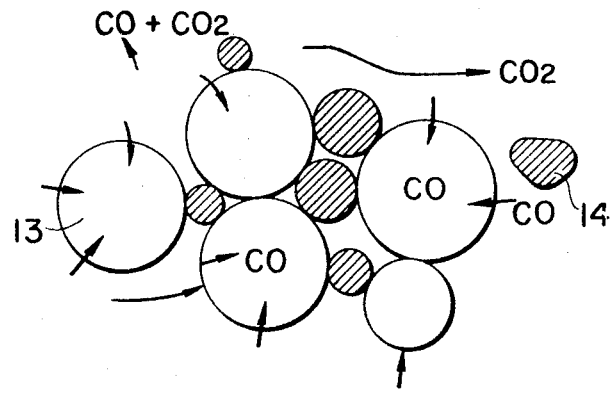
FIG. 2 is a schematic view similar to FIG. 1 but in the prior art.

On the other hand, in a conventional method, as will be seen from FIG. 2, the layer of reducing atmosphere is difficult to stick on the surface of each pellets 13 and is also inferior in the ability of contacting with carbon material 14. In addition, since the CO which is ready to permeate into the pellet for the reduction thereof may be subjected to oxidation by $O_2$ in the atmosphere, there is also a large chance of loss of the effective CO.

It has been shown by experiments that the contents of gas which was absorbed and collected from the surface of pellets to be reduced (after 1 hour past) are 75% CO, 19.5% $CO_2$, 3.2% $H_2$ and 0.7% $O_2$ and this gas can be seen burning with a long flame when air is introduced in it. From these facts it can be found that the pellets are surrounded by a very strong reducing atmosphere and resistant to re-oxidation.

As mentioned above, in this invention, the reducing reaction of carbon containing pellets is made easy by the carbon contained in themselves and a high F.C. efficiency and a high reducing efficiency can be attained, as compared with the other methods of adding carbon material from the outside for reducing reaction.

The pellets thus, after the reduction, contain a high content of metallic iron, and their strength, owing to the bond of the metallized iron, as shown in the example, lies between 340 kg. (maximum) and 120 kg. (minimum) in the case where the mixing ratio of the blast furnace dust to the converter dust is 6:4, and lies between 304 kg. (maximum) and 100 kg. (minimum) in the case of mixing ratio of 4:6. The content of metallic iron of the latter becomes less than the former. These values satisfy the compression strength required for the blast furnace charge. Further, the high content of metallic iron as a coolant for the L.D. furnace is advantageous.

As mentioned above, according to this invention, since an extremely fine particle size of blast furnace dust and converter dust can be used, the grinding process for the preparation of pellets can be omitted. Further, the carbon existing in the blast furnace dust can be effectively used as a reducing agent for the pellets. Moreover, as these carbon containing pellets are extremely strong green pellets as compared with other conventional ones, the pellets of this invention have a high crushing strength in the reducing furnace at a high temperature and are not pulverized. And, the reducing reaction of the carbon containing pellets is an extremely effective reaction, and the content of metallic iron is very high after completion of reduction so that the products can be re-used as iron sources of very high strength for blast furnace or L.D. converter. In the following, an example of this invention is shown:

EXAMPLE

Figure 3:
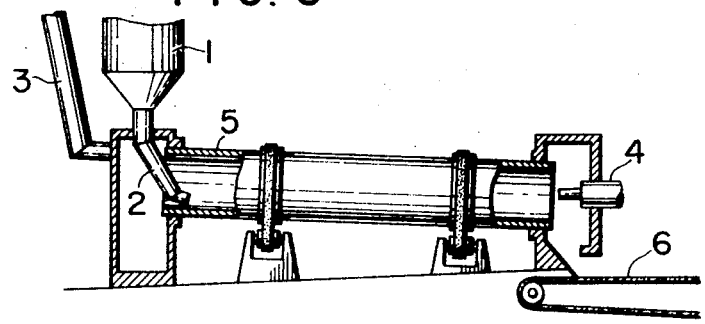
FIG. 3 illustrates schematically an equipment used for carrying out a method according to the invention.

For the reducing operation according to the invention, equipment as shown in FIG. 3 was used. Dried pellets having the composition as will be shown in the following tables are charged from a material storage vessel 1 through a supplying chute 2 into a rotary reducing furnace 5 (outer diameter: 700 m./m., inner diameter: 500 m./m. and length: 2.5 m.), heated by burner 4 and reduced while moving in the furnace, and finally discharged, by means of a cooling conveyor 6 for taking out the reduced pellets. Waste gases are exhausted through an exhaust pipe 3.

1. Preparation of green pellets

TABLE 1

(a) Chemical components of material used (in weight percent)

| | C | TFe | FeO | $Fe_2O_3$ | $Al_2O_3$ | $SiO_2$ | CuO | MgO | P | S | Zn | As | Cu |
|---|---|---|---|---|---|---|---|---|---|---|---|---|---|
| (A) Blast furnace dust | 32.0 | 31.0 | 15.0 | 27.64 | 3.24 | 6.0 | 4.27 | 1.27 | 0.120 | 0.52 | 1.50 | 0.014 | .020 |
| (B) Converter dust | 0.4 | 34.0 | 3.0 | 88.30 | 0.15 | 1.2 | 7.01 | | 0.100 | 0.120 | 0.10 | | |

TABLE 2

(b) Distribution of particle sizes

| Mesh | +6.5 | +100 | +150 | +200 | +270 | +325 | −325 |
|---|---|---|---|---|---|---|---|
| Material: | | | | | | | |
| A | 1.5 | 6.6 | 10.7 | 8.4 | 8.4 | 4.8 | 59.6 |
|   | 1.7 | 4.1 | 8.7 | 10.5 | 7.6 | 4.8 | 62.6 |
| B | 1.4 | 1.2 | 0.8 | 1.0 | 1.5 | 1.0 | 93.1 |
|   | 1.6 | 0.6 | 0.6 | 0.5 | 0.5 | 0.6 | 94.6 |

TABLE 3.—COMPONENTS OF THE MIXTURES (c) The materials of Tables 1 and 2 were mixed uniformly in the following two ratios: A:B=60:40 and A:B=40:60

| | C | TFe | FeO | Fe₂O₃ | S | SiO₂ | P | Zn |
|---|---|---|---|---|---|---|---|---|
| A:B | 18.9 | 44.70 | 5.32 | 57.60 | 0.392 | | | |
| 60:40 | 18.8 | 44.58 | 4.69 | 58.52 | 0.365 | 625 | 0.105 | |
|       | 17.4 | 43.62 | 4.83 | 59.86 | 0.364 | | | 0.789 |
| 40:60 | 13.5 | 49.91 | 4.14 | 66.76 | 0.332 | | | |
| 30:70 | 9.5 | 54.2 | 6.60 | 70.10 | 0.270 | | | |

By adding 1.0 percent bentonite to the mixture thus obtained and adjusting the water content thereof to 7–9 percent, the following green pellets were formed by use of a disk-type pelletizer. After they were dried at 250° C., the strength thereof was measured.

TABLE 4

(d) Strength of green pellets (1% bentonite, A:B=60:40)

| | Minimum | Average | Maximum, kg. |
|---|---|---|---|
| 18 m./m. in diameter | 8.0 | 8.7 | 10.5 |
|  | 6.9 | 7.5 | 9.8 |
| After dried at 250° C | 20 | 24.5 | 30 |
|  | 18.5 | 22.8 | 29 |

Next, the carbon containing pellets having the above strength were charged into the rotary reducing furnace shown in FIG. 3 and reduced at a speed of from 0.52 to 0.82 r.p.m. and a slope angle 36° of the furnace so that they stayed therein for a reaction time of 25 minutes and a preheating time of 30 minutes, therefore 55 minutes in total, and as a result, the reduced pellets shown in Table 8 were obtained. For the purpose of comparison, the F.C. efficiency in a usual method is shown in Table 6. Compression strength at room temperature is shown in Table 7.

TABLE 5

F.C. efficiency of the pellets prepared in accordance with the invention (A:B=40:60)

| RC | T.Fe | MeFe | FeO | Fe₂O₃ | P | S | MFe/T.Fe | Reduction degree, D.R. | F.C. Efficiency |
|---|---|---|---|---|---|---|---|---|---|
| 5.68 | 66.49 | 46.35 | 23.43 | 2.76 | 0.160 | 0.544 | 69.8 | 78.6 | 104.3 |
| 5.20 | 69.53 | 53.80 | 17.04 | 3.55 | 0.155 | 0.496 | 77.5 | 83.5 | 127.5 |
| 6.91 | 64.84 | 37.80 | 32.66 | 2.37 | 0.148 | 0.488 | 58.3 | 70.7 | 103.2 |
| 2.11 | 68.42 | 34.76 | 40.11 | 3.55 | 0.150 | 0.416 | 50.8 | 65.3 | 70.6 |

TABLE 6

F.C. efficiency of the pellets prepared by a usual method (heavy oil 68 l./T, reducing agent 235.8 kg./T, ore: 1,041.7 kg./T, F.C.: 165 kg./T)

| RC | T.Fe | MeFe | FeO | Fe₂O₃ | P | S | MFe/T.Fe | D.R. | F.C. Efficiency |
|---|---|---|---|---|---|---|---|---|---|
| 0.96 | 61.94 | 27.69 | 40.22 | 4.27 | 0.038 | 0.082 | 45.5 | 55.6 | 61.4 |
| 0.64 | 61.29 | 25.16 | 43.28 | 3.56 | 0.039 | 0.076 | 41.0 | 52.8 | 59.4 |
| 0.84 | 60.34 | 26.04 | 40.97 | 3.51 | 0.038 | 0.073 | 43.3 | 54.4 | 59.5 |
| 0.89 | 61.92 | 22.68 | 45.80 | 5.20 | 0.034 | 0.080 | 36.7 | 48.8 | 58.8 |
| 1.06 | 62.31 | 26.67 | 41.57 | 4.77 | 0.035 | 0.080 | 42.9 | 53.6 | 57.9 |

TABLE 7

Compression strength of the reduced pellets at room temperature

| Ratio | | Pellet diameter, m./m. | Minimum kg. (n) | Maximum kg. (n) | Average kg. (n) |
|---|---|---|---|---|---|
| A | B | | | | |
| 60 | 40 | 12.7 | 120 (50) | 340 | 201 |
|    |    |      | 102 (65) | 304 | 134 |
| 40 | 60 | 14.0 | 100 (128) | 164 | 127 |
|    |    | 12.7 | 96 (115) | 215 | 117 |

TABLE 8

Chemical components of the pellets reduced in the rotary reducing furnace A:B=60:40

| RC | T.Fe | MFe | FeO | Fe₂O₃ | SiO₂ | MgO | CaO | Al₂O₃ | P | S | Zn | Cu |
|---|---|---|---|---|---|---|---|---|---|---|---|---|
| 5.5 | 74.56 | 73.16 | 1.44 | 0.20 | 7.68 | 1.09 | 4.65 | 3.06 | 0.162 | 0.262 | 0.178 | 0.033 |
| 3.32 | 72.04 | 61.04 | 11.54 | 2.90 | | | | | | 0.440 | | |
| 1.64 | 73.45 | 60.56 | 13.34 | 3.61 | 8.50 | | | | 0.170 | 0.432 | | |

A:B=40:60

| 0.48 | 72.72 | 43.47 | 34.18 | 3.48 | | | | | | 0.310 | | |

3. Compression strength of pellets

Figure 4:
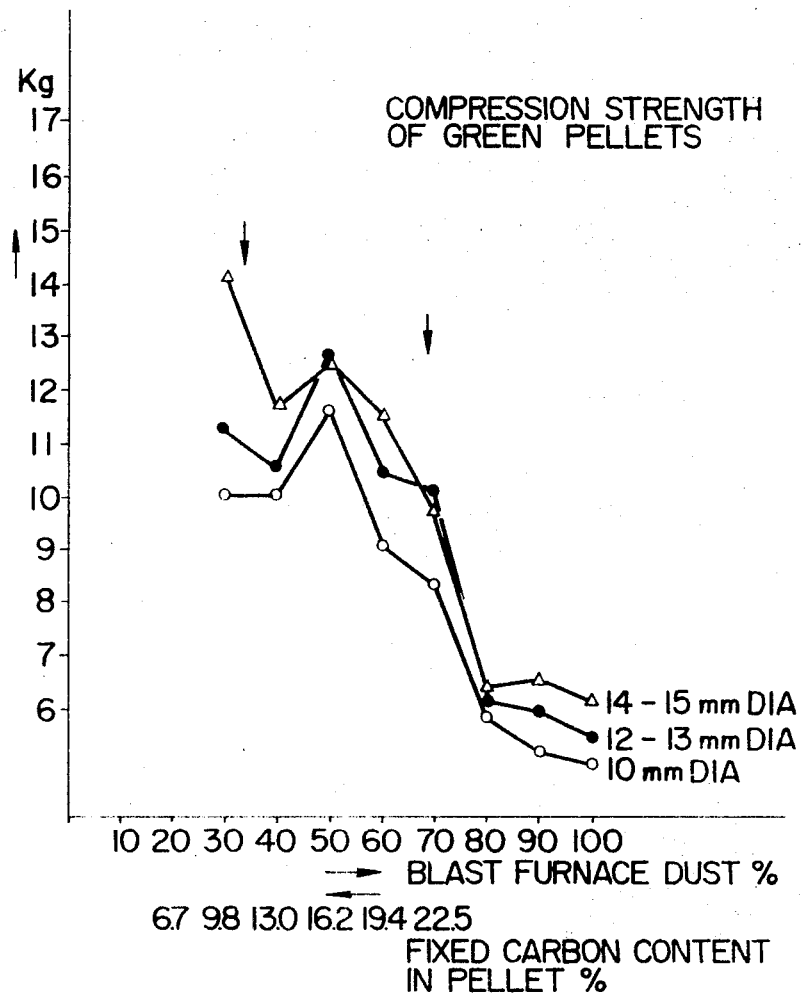

In FIGS. 4 and 5 are illustrated the relationship between the compression strength of green pellets and the content of carbon contained therein before and after drying.

As is seen from these graphs, the compression strength decreases with increase in the content of blast furnace dust. The lower limit of the compression strength of practical use lies in the vicinity of the 20% of carbon content (70 percent of blast furnace dust content). On the other hand, the compression strength increase with increase in the content of L.D. dust. The reason for this seems to be that the particle size of this dust is fine. However, since the content of carbon in the pellets decreases with increase in the content of L.D. dust, a limit is set on the quantity of L.D. dust to be mixed with the furnace dust. It has been by experiments that the mixing ratio of the blast furnace dust to the L.D. dust ranges from 30:70 to 70:30. In this range of mixing ratio, the content of carbon in the pellets comes within the range from 7 to 20 percent by weight.

What is claimed is:

1. A method of preparing high strength pellets containing oxides of iron and metallic iron from flue dust of blast furnace and converter comprising: (1) mixing from 70 to 30 weight parts blast furnace dust and from 30 to 70 weight parts converter dust with each other without any preliminary grinding of these dusts, and without removal of carbon contained in said dusts, said oxides of iron being so chosen that at least 70 percent are able to pass 325-mesh screen, to form 100 weight parts of green pellets containing from 7 to 20 percent by weight of carbon, (2) drying said pellets to remove water at a temperature below 250° C., (3) heating and reducing the dried pellets, the carbon material contained in the said pellets, thus forming gaseous oxides of carbon, said carbon material contained in said pellets and said gaseous oxides of carbon constituting substantially the sole sources of materials used in reducing said pellets (4) withdrawing the reduced pellets and separating the gaseous oxides of carbon therefrom, and (5) cooling and recovering the reduced pellets of high strength.

2. The method of claim 1, wherein from about 60 to about 40 parts by weight of blast furnace dust are mixed with from about 40 to about 60 parts by weight of converter dust.

3. The method of claim 2, wherein about 1 percent by weight of bentonite is added to the mixture of blast furnace dust and converter dust.

4. The method of claim 2, wherein about 60 parts by weight of blast furnace dust is mixed with about 40 parts by weight of converter dust.

5. The method of claim 2, wherein about 40 parts by weight of blast furnace dust is mixed with about 60 parts by weight of converter dust.

6. The method of claim 1, wherein about 30 parts by weight of blast furnace dust is mixed with about 70 parts by weight of converter dust.

7. The method of claim 1, wherein the rotary furnace is operated at a speed of 0.52 to 0.82 r.p.m. and slope angle of 36°.

8. The method of claim 1, wherein the reduction time is about 25 minutes.

9. The method of claim 8, wherein prior to reduction the charge to rotating furnace is pretreated for about 30 minutes.

10. The method of claim 1, wherein the pellets are from about 12 to about 18 mm. in diameter.

* * * * *